United States Patent
Jones

[15] 3,650,195
[45] Mar. 21, 1972

[54] FLASH ADAPTER FOR PRESS CAMERA

[72] Inventor: Richard B. Jones, 2932 Belle St., San Bernardino, Calif. 92404

[22] Filed: Apr. 25, 1967

[21] Appl. No.: 633,527

[52] U.S. Cl. .................................................... 95/86
[51] Int. Cl. ...................................................... G03b 17/56
[58] Field of Search .................................................... 95/86

[56] References Cited

UNITED STATES PATENTS

| | | | |
|---|---|---|---|
| 2,750,489 | 6/1956 | Gibson | 95/86 X |
| 2,949,838 | 8/1960 | Skalabrin | 95/86 |
| 2,996,967 | 8/1961 | Edgerton | 95/86 X |
| 3,064,547 | 11/1962 | Humphies | 95/86 |

Primary Examiner—John M. Horan
Attorney—Dana E. Keech

[57] ABSTRACT

Light cast metal outer and inner rings, the opening in the latter being about 8 inches in diameter, said inner ring journaling in said outer ring, for ready coaxial rotation therein. Two vertical horizontally diametrically opposed handles are provided, each being fixed to one of said rings, said handles being simultaneously gripped by the right and left hands in supporting the adapter and rotating said inner ring in said outer ring. Said inner ring supports a camera in its opening. The top of said outer ring rockably supports a flasher unit pivoted thereon on a transverse axis. A cable shutter release is thumb actuatable by a hand gripping one of said handles. A device locking said inner ring against rotation, and while variously rotationally positioned, relative to said outer ring is located for thumb actuation by the other hand while gripping the other handle. A platform adjustably mounted on said inner ring at the bottom of said opening provides a rigid support for a camera variously positioned in said opening.

3 Claims, 6 Drawing Figures

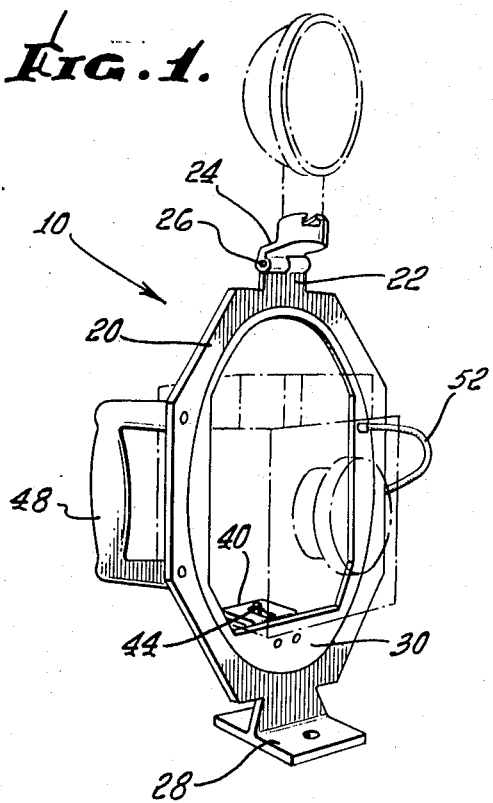
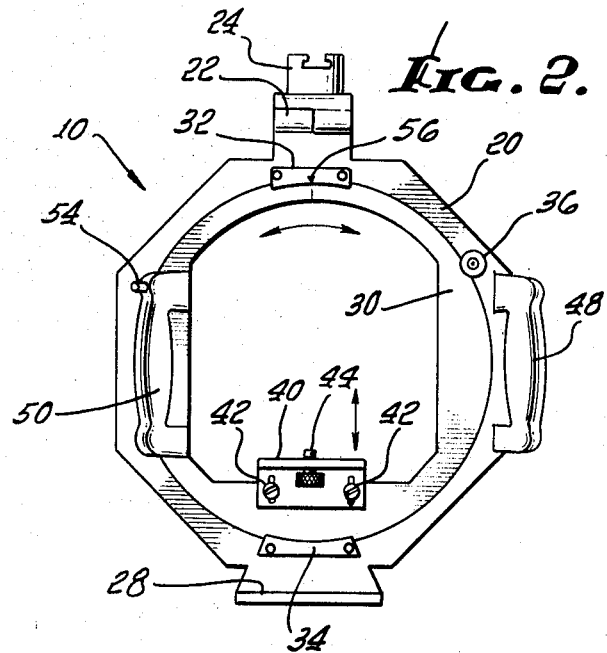
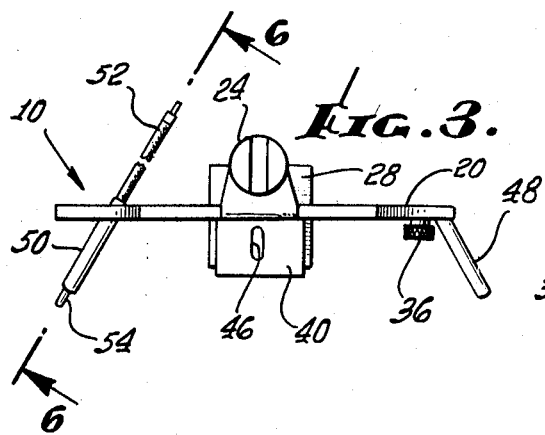
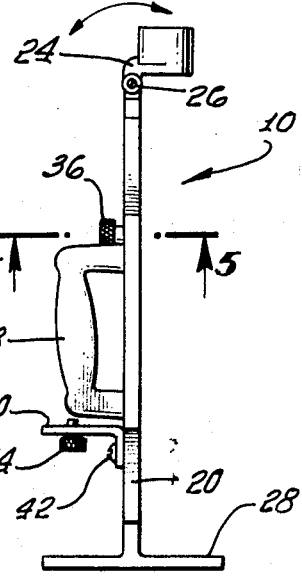
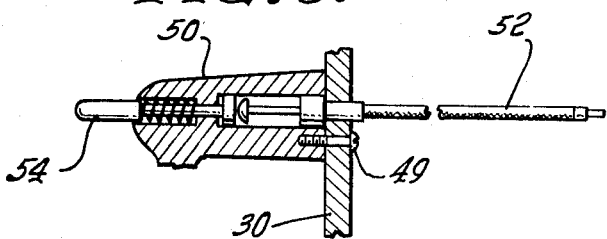

FLASH ADAPTER FOR PRESS CAMERA

This invention relates to flash adapters for Press Camera's and particularly to a rigid, precision unit, with the flash unit in the proper relation to the camera lens for professional results. This flash adapter unit having the camera mounted rotatably on a camera mounting ring for easily changing the format of the picture without changing the camera in relation to the flash unit. The flash mounting bracket is adjustable angularly for directing the lights as desired.

One of the main objects of the invention is to properly locate the flash unit in relation to the lens, by placing the flash unit directly above the lens.

Another object of the invention is to provide a rigid precision unit, for rotating the camera in relation to the flash unit for the purpose of changing the picture format on rectangular film.

Still another object of the invention is to provide a rigid precision unit which can be easily hand held and operated or mounted on a tripod.

Yet another object of the invention is to locate all controls in a position to be thumb operated while the unit is hand held.

A further object of the invention is to adapt commercially available flash units to the more expensive professional type Press Camera's in a single precision unit.

Yet another object of the device is to provide for horizontal leveling of the camera when it is mounted on a tripod.

Other objects and advantages of the present invention will become apparent to those skilled in the art upon consideration of the following detailed description of the preferred embodiment thereof, reference being had to the accompanying drawings, wherein:

FIG. 1 is a front perspective view of the device with camera and flash unit mounting indicated in broken lines.

FIG. 2 is a back view of the device.

FIG. 3 is a top view of FIG. 2.

FIG. 4 is a side view of FIG. 2.

FIG. 5 is an enlarged sectional detail view taken on line 5—5 of FIG. 4.

FIG. 6 is an enlarged sectional detail view taken on line 6—6 of FIG. 3.

Referring to the drawings, a camera and flash adapting unit 10 is composed of parts consisting of a cast metal outer ring or supporting member 20 and an integral cast metal hinge half 22 on which is pivotally mounted a composite hinge half and flash mounting shoe 24 frictionally secured by a screw 26. A T-shaped tripod mounting base 28 is an integral cast part of said supporting member 20.

A rotatable camera supporting inner ring 30 is recessed into the supporting outer member 20 and retained in place by an upper plate 32 and a lower plate 34. A locking nut 36 and screw 38 lock the inner ring 30 in the outer supporting member 20 after the inner ring 30 has been rotatably positioned. A camera mounting bracket 40 is attached to inner ring 30 by screws 42 in a manner to be vertically adjustable. A camera mounting screw 44 is retained in bracket 40 which has an elongated hole 46 for further positioning the camera.

Handle 48 is mounted on the outer supporting member 20 where the right thumb is available to adjust locking nut 36. Handle 50 is secured by screws 49 to the inner ring 30 and contains a cable shutter release 52 which is operated by the left thumb pressing plunger 54.

An indexing mark 56 is provided on upper plate 32 to line up indexing marks on inner ring 30 to facilitate adjustment of the camera for vertical or horizontal formats or angular settings.

The operation of the device is a matter of selecting the camera and flash combination desired and mounting to my adapter unit 10. All necessary adjustments such as tilting the angle of the flash unit, and rotating the camera for leveling or changing the format can then be made without moving the camera from an eye to viewfinder position. At all times the flash unit stays spaced directly upwards from the camera which is the best position for the most advantageous lighting.

When my device is mounted on a tripod it provides a horizontal leveling feature which is not normally available on tripods.

The disadvantages of a fixed flash unit mounting are overcome by the hinged flash mounting shoe, making possible such lighting effects as bounce lighting without removing the flash unit from the camera.

I claim:

1. A camera and flash lamp adapter unit comprising:

a relatively light weight outer ring;

a relatively light weight inner ring mounted within and coaxially rotatable relative to said outer ring;

means at the bottom of said inner ring for mounting a camera on said inner ring while occupying the opening thereof;

means for mounting a flash lamp on said outer ring at the top thereof; and two handles provided at opposite sides of said unit, one on said outer ring and one on said inner ring, whereby said unit, equipped with camera and flash lamp may be readily supported and manipulated as an entity in taking pictures by gripping said handles in the two hands, while by the same means and without letting go of the handles the inner ring and camera may be rotated to any desired rotational relationship relative to said outer ring and flash lamp.

2. A camera and flash lamp adapter unit as recited in claim 1 wherein means is provided on said unit operable by the hand gripping one of said handles, without relaxing its grip, to release the shutter of said camera, and means is provided on said unit operable by the other hand without relaxing its grip on the other of said handles for setting said inner ring in a given rotational relation to said outer ring, or when released, permitting said inner ring to be rotated to a different selected rotational relation with said outer ring by the application of said hands to said handles.

3. A camera and flash lamp adapter unit as recited in claim 1 wherein a shutter release is provided on one of said rings thumb operable by the hand holding the handle on said ring; and an inner ring locking means is provided on the other ring thumb operable by the hand holding the handle on said other ring, for setting said inner ring in given rotational relation to said outer ring, or, when released, permitting said inner ring to be rotated to a different selected rotational relation with said outer ring by the application of said hands to said handles.

* * * * *